United States Patent [19]
Kozuka et al.

[11] Patent Number: 5,831,166
[45] Date of Patent: Nov. 3, 1998

[54] METHOD OF NON-CONTACT MICROMANIPULATION USING ULTRASOUND

[75] Inventors: Teruyuki Kozuka, Okazaki; Hideto Mitome, Aichi-ken; Toru Tuziuti, Nagoya, all of Japan

[73] Assignee: Agency of Industrial Science & Technology, Ministry of International Trade & Industry, Tokyo, Japan

[21] Appl. No.: 726,300

[22] Filed: Oct. 2, 1996

[30] Foreign Application Priority Data

Jan. 23, 1996 [JP] Japan .................................. 8-029813

[51] Int. Cl.$^6$ .................................................. B01D 17/06
[52] U.S. Cl. ........................ 73/570; 73/432.1; 210/748; 55/277
[58] Field of Search .................................... 210/748, 738, 210/188; 209/155; 406/198; 367/137, 138, 191; 55/15, 277; 73/570, 432.1

[56] References Cited

U.S. PATENT DOCUMENTS

| | | | |
|---|---|---|---|
| 4,688,199 | 8/1987 | Lock | 367/137 |
| 4,879,011 | 11/1989 | Schram | 204/157.42 |
| 4,983,189 | 1/1991 | Peterson et al. | 55/15 |
| 5,033,033 | 7/1991 | Schram | 367/191 |
| 5,085,783 | 2/1992 | Feke et al. | 210/748 |
| 5,225,089 | 7/1993 | Benes et al. | 210/748 |
| 5,484,537 | 1/1996 | Whitworth | 210/748 |
| 5,527,460 | 6/1996 | Trampler et al. | 210/198.1 |

OTHER PUBLICATIONS

"Selective Manipulation of Micro Particles Using Ultrasound", Teruyuki Kozuka et al. National Industrial Research Institute of Nagoya Agency of Industrial Science and Technology; vol. 94, No. 461. pp. 33–40 (with English Abstract).

Reference No. 00408001 —Program of 19$^{th}$ Meeting of Nonlinear Acoustics Research Organization Data (95–2) —Manipulation of Micro Particles By Standing Wave Field Control —Nat. Ind. Res. Inst. of Nagoya, AIST, MITI Teruyuki Kozuka, Toru Tuziuti, Hideto Mitomi.

The Institute of Electronics, Information and Communication Engineers —Technical Report of IEICE. US94–82, EA94–84(1995–01) —Selective Manipulation of Micro Particles Using Ultrasound —Teruyuki Kozuka, Toru Tuziuti and Hideto Mitome, National Industrial Reseach Institute of Nagoya Agency of Industrial Science and Technology, MITI 1–1 Hirate–cho, Kita–ku, Nagoya 462, Japan.

*Primary Examiner*—Hezron E. Williams
*Assistant Examiner*—Rose M. Miller
*Attorney, Agent, or Firm*—Oblon, Spivak, McClelland, Maier & Neustadt, P.C.

[57] ABSTRACT

A method of non-contact micromanipulation using ultrasound includes providing a concave ultrasound transducer in a liquid medium in which micro particles are distributed, positioning a reflector at the focal point position of the transducer and radiating ultrasound from the transducer to form a standing wave field between the transducer and the reflector to align and trap micro particles at half wavelength intervals along the axis of the transducer.

4 Claims, 12 Drawing Sheets

METHOD OF NON-CONTACT MICROMANIPULATION USING ULTRASOUND

BACKGROUND OF THE INVENTION

1. Field of the Invention:

This invention relates to a micromanipulation method for handling micro particles. More particularly, the invention relates to a method of non-contact micromanipulation using ultrasound.

2. Description of the Prior Art:

In various fields such as biotechnology, materials development, micromachinery and the like there has been a strong need for a method of manipulating micro particles. This has led to research into and development of such a method. In addition to being commercially advantageous, such a micromanipulation method needs to take into account the special nature of matter at the micro level.

At the micro level, forces such as the forces arising from friction between solids or the viscosity of liquids become more dominant than inertial forces. In addition to this, while microscopic particles of dust and the like can be ignored at the normal, non-microscopic level, they form major obstructions that cannot be ignored when it comes to the manipulation of micro particles. As a result, methods of trapping and moving micro particles do not work well when a manipulator is used that is simply a scaled down version of a mechanical manipulator used to handle objects on a normal scale, that is, on a non-microscopic scale.

To resolve the special problems involved in handling objects at the micro level, a number of non-contact micromanipulation methods have been proposed that use electrostatic force, laser beam radiation pressure or other such forces to effect the desired manipulation. In addition to resolving the above problems, such non-contact methods have the excellent effect of preventing the objects being manipulated from being contaminated by the manipulation. However, each of the methods has its own particular drawbacks.

Among the problems of the method of micromanipulation using electrostatic force are that it has a short working distance, electrolysis arises in the electrodes, and that the objects and atmosphere being manipulated are subject to limitations relating to conductivity.

The method of micromanipulation using laser beam radiation pressure is limited to objects that transmit or refract light. Also, the force produced by the laser beam radiation pressure is so small that it can only be used to manipulate extremely small objects. Among further drawbacks are that the method requires costly equipment, and care must be taken to ensure that the human body is protected from harm.

However, it is well-known that when an object is placed in an ultrasonic wave field formed in a fluid medium, acoustic radiation pressure is produced around the object, with the force acting on the object being dependent on where the object is located. When for example the sound field is a traveling wave, the object in the medium is subjected to the force of a pressure acting in the direction of the ultrasonic traveling wave.

In the fluid medium an ultrasonic wave field can be obtained as a one-dimensional standing wave formed by the superposition of two plane waves traveling in opposite directions, that have the same frequency and amplitude. It is also well-known that provided the object (hereinafter referred to as a micro particle) is sufficiently smaller than the wavelength of the standing wave, the acoustic radiation force produced around the micro particle urges the micro particle toward the nearest of dynamically stable positions located at half wavelength intervals. In the case of round micro particles, the positions of dynamically stable locations are determined by the value of parameters in the following equation (1) in which $\rho_0$ is the density of the medium, $\rho$ is the micro particle density, $\beta_0$ is the compressibility of the medium and $\beta$ is micro particle compressibility.

$$B+(1-\gamma) \tag{1}$$

Here, $B=3(\rho-\rho_0)/(2\rho+\rho_0)$ and $\gamma=\beta/\beta_0$.

When $B+(1-\gamma)>0$, nodes of a sound pressure distribution in a one-dimensional standing wave become dynamically stable locations, and when $B+(1-\gamma)<0$, antinodes of the sound pressure distribution in a one-dimensional standing wave become dynamically stable locations.

A number of manipulation methods using the radiation force of an ultrasonic traveling or standing wave have been studied. Since in these methods the acoustic radiation force is produced by spatial changes in the energy density of the sound waves in the medium, it follows that if it was done in the medium in which the sound waves were propagated, it was possible to utilize the radiation force. Also, this has the major additional advantage of expanding the range of particles that can be manipulated so long as the particles have a different acoustic impedance from that of the medium and therefore reflect or absorb the sound waves. Among other advantages are that the cost of the apparatus is relatively low, and the fact that ultrasonic waves can be blocked by providing a layer of air between the liquid medium and any human body means that it is easy to ensure people's safety.

In Technical Report US94-82, EA94-84 (1995-01) of the Institute of Electronics, Information and Communication Engineers (IEICE), the present inventors describe manipulation of micro particles using ultrasound. To do this, standing ultrasonic waves were generated in water by using a flat, round transducer to radiate ultrasonic waves and a reflector to reflect the ultrasound. Using the radiation force of the ultrasonic standing wave fields, alumina particles suspended in the water were trapped and agglomerated at half wavelength intervals in small regions in the vicinity of nodes of the sound pressure distribution along the axis of the standing wave forming dynamically stable points. Particle agglomerations at each node were then moved along the axis line by varying the frequency of the ultrasound waves.

While with this method the alumina particles are trapped and agglomerated in sufficiently small regions in the vicinity of stable points along the axis of the transducer, in the plane perpendicular to the transducer axis, the trapping takes place over quite a large region centering on the transducer axis. Moreover, while adjusting the standing wave frequency moves each agglomeration axially, it was established that there was also movement orthogonal to the axis, with the orthogonal movement being of an extent that was too great to be disregarded. This may be because, regardless of location, an extensive standing wave of a substantially constant amplitude is formed around the central axis, resulting in a large number of stable points extending over a relatively large area around the axis, with these stable points having the same degree of dynamic stability as the stable points along the axis, and these stable points are moved perpendicularly to the line of the axis by a considerable amount by slight variations in frequency and by slight sound field changes accompanying the movement of the alumina particles.

Thus, the presence of large numbers of relatively stable points in a plane perpendicular to the axis makes it impossible to localize micro particles in small regions in a plane perpendicular to the line of the axis. Also, the major orthogonal displacement in stable point location caused by slight field changes brought about by slight variations in frequency or movement of micro particles makes it difficult to fix the micro particles at prescribed axial locations, and also makes it difficult to effect such axial movement with good precision.

SUMMARY OF THE INVENTION

An object of the present invention is to provide a method of precise, non-contact micromanipulation using ultrasound that enables stable entrapment of micro particles at prescribed small regions and enables the trapped micro particles to be moved in a desired direction.

Based on extensive research aimed at resolving the problems, the inventors found that, by using a concave ultrasound transducer in place of a flat transducer and providing a focal point on the reflector, it was possible to form a large-amplitude standing wave field just in the vicinity of the focal point.

The present invention attains the above object by providing a method of non-contact micromanipulation using ultrasound, comprising providing a concave ultrasound transducer in a liquid medium in which micro particles are distributed, disposing a reflector at a focal point position of the transducer and radiating ultrasound from the transducer to form a standing wave field between the transducer and the reflector to align and trap micro particles at half wavelength intervals along a center axis of the transducer.

Thus, in accordance with the method of non-contact micromanipulation using ultrasound of this invention, ultrasound radiation is produced by a concave transducer, the focal point of which is on a reflector. This forms a standing wave field, and since the ultrasonic wave energy is focused onto the focal point region, the standing wave amplitude is greatest around the focal point. As a result, relatively stable sound field points are concentrated only in the vicinity of the axis near the reflector. This makes it possible for the micro particles distributed in the liquid medium to be stably aligned and trapped in small regions in the vicinity of each of the stable points, which is to say at half wavelength intervals. In that state the micro particles are not easily affected by slight fluctuations in frequency or by slight field changes accompanying movement of the micro particles themselves.

The micro particles thus stably trapped can be moved in a prescribed direction with high precision by moving the transducer and reflector or by another such method.

Moreover, since the method of manipulating micro particles according to this invention uses ultrasound and is therefore a non-contact method, it has all the advantages of the above-described methods that use ultrasound, that is, a wide range of micro particles can be securely manipulated and trapped, the apparatus is inexpensive, and it is easy to ensure its safety, and in addition the micro particles are virtually unaffected by friction or dust or the like, and are not contaminated by the manipulation process.

Furthermore, with this method of non-contact micromanipulation using ultrasound according to the present invention, trapped micro particles can be moved along the central axis of the transducer by adjusting the frequency of ultrasound radiating from the transducer.

In accordance with the method of this invention, the position of stable points in the sound field located every half wavelength can be changed by adjusting the frequency of ultrasound waves emitted by the transducer. Moving a stable point will also-move micro particles trapped in the vicinity of the stable point. Thus, the apparatus involved does not need to have any moving parts to effect the movement of trapped micro particles to another desired location along the transducer axis. The intervals at which micro particles are trapped can be changed by changing the wavelength of the ultrasound in the liquid medium. This enables the micro particles to be moved by a distance corresponding to the degree by which the wavelength is changed, with a precision that is determined by the operating precision of the transducer and the precision of ultrasound velocity in the liquid medium under the conditions of use.

By also enabling the frequency of ultrasound from the transducer to be selectively changed in steps, the direction in which micro particles trapped every half wavelength are moved can be selected and micro particles separated or combined. When the frequency can thus be changed in steps, each time the frequency is changed, micro particles trapped at the preceding frequency will move to the vicinity of the stable point that comes closest to the entrapment position. Therefore, using a plurality of stable points as a branch point, when the frequency is increased in steps, a column of micro particles aligned at half wavelength intervals along the transducer axis will divide into a plurality of columns that are mutually separated by an amount corresponding to the amount by which the frequency is increased. Conversely, decreasing the frequency will cause some of the aligned micro particles to be trapped in the vicinity of the same stable points, forming agglomerations. Thus, columns of micro particles aligned along the axis of the transducer can be separated at a specific stable point by a prescribed amount by a stepped increase in the frequency of the trapping ultrasound. Conversely, a column of micro particles can be partially consolidated by a stepped decrease in the trapping frequency.

In the method of non-contact micromanipulation using ultrasound according to this invention, it is desirable for the ultrasound waves to be emitted by the transducer in burst waves.

By radiating burst waves, standing wave fields are formed intermittently at a time-based rate that is substantially equal to the duty ratio of the wave pulses in the medium. Here, the force acting on the medium and the force acting on an object in a burst wave will be considered. The radiation force of the ultrasonic standing wave field that traps micro particles can be considered as being proportional to the square of the sound pressure amplitude. Also, the driving force of the medium flow referred to as the acoustic streaming can be considered as being proportional to the time-averaged value of the square of the sound pressure amplitude. Using a burst wave enables the time-averaged square of the amplitude to be decreased while maintaining the square of the amplitude at a required value. Therefore, by using a burst wave, during manipulation of micro particles the effect of the acoustic streaming on the trapped micro particles can be reduced by keeping down the acoustic streaming velocity to thereby decrease the driving force of the acoustic streaming, while at the same time maintaining the particle trapping force at the required level. As a result, trapped micro particles can be securely moved, even when the frequency is changed in large increments, or when using a transducer with a large focal distance so the effect of a high acoustic streaming is correspondingly greater. It therefore becomes possible to increase the range of stepped frequency changes used to separate or combine trapped micro particles. Trapped micro particles can also be moved over a longer distance by using a transducer with a long focal distance.

It is also desirable to be able to switch between continuous ultrasound wave radiation and burst wave radiation. Micro particles will be constantly urged toward stable points by the acoustic radiation force of a standing wave field formed by a continuous wave. Also, even when micro particles are moving at a high velocity relative to the medium, such as when they are injected into the medium, the particles will still be reliably trapped in the vicinity of sound field stable points. The above-described effects of using burst waves can then be obtained by switching over from continuous to burst wave mode.

When the transducer is used to radiate ultrasound waves in pulses, it is even more desirable for burst waves to have a duty ratio of not less than 3%. When a voltage that is not less than a prescribed level is being applied to the transducer, this ensures that once a micro particle has been trapped in the vicinity of a stable point, it is subjected to substantially the same trapping effect as that provided by a continuous wave action, further enhancing the above-described effects.

As described in the foregoing, the method of this invention enables non-contact alignment and movement of micro particles suspended in a liquid. This makes the method suitable for various applications. As one example, it can be used for biotechnology applications involving the manipulation of cells and blood components. It could also be used in the manipulation of organic particles such as in plant breeding research. High purity and uniformity of micro particles of raw material are required in the field of inorganic materials. Since the forces at work in an ultrasonic wave field vary depending on micro particle dimensions and acoustic characteristics, a standing wave field can be used to separate particles of the same size from other particles in a group, or to remove particles having different characteristics.

Further features of the invention, its nature and various advantages will be more apparent from the accompanying drawings and following detailed description of the invention.

DESCRIPTION OF THE PREFERRED EMBODIMENT

Figure 1:
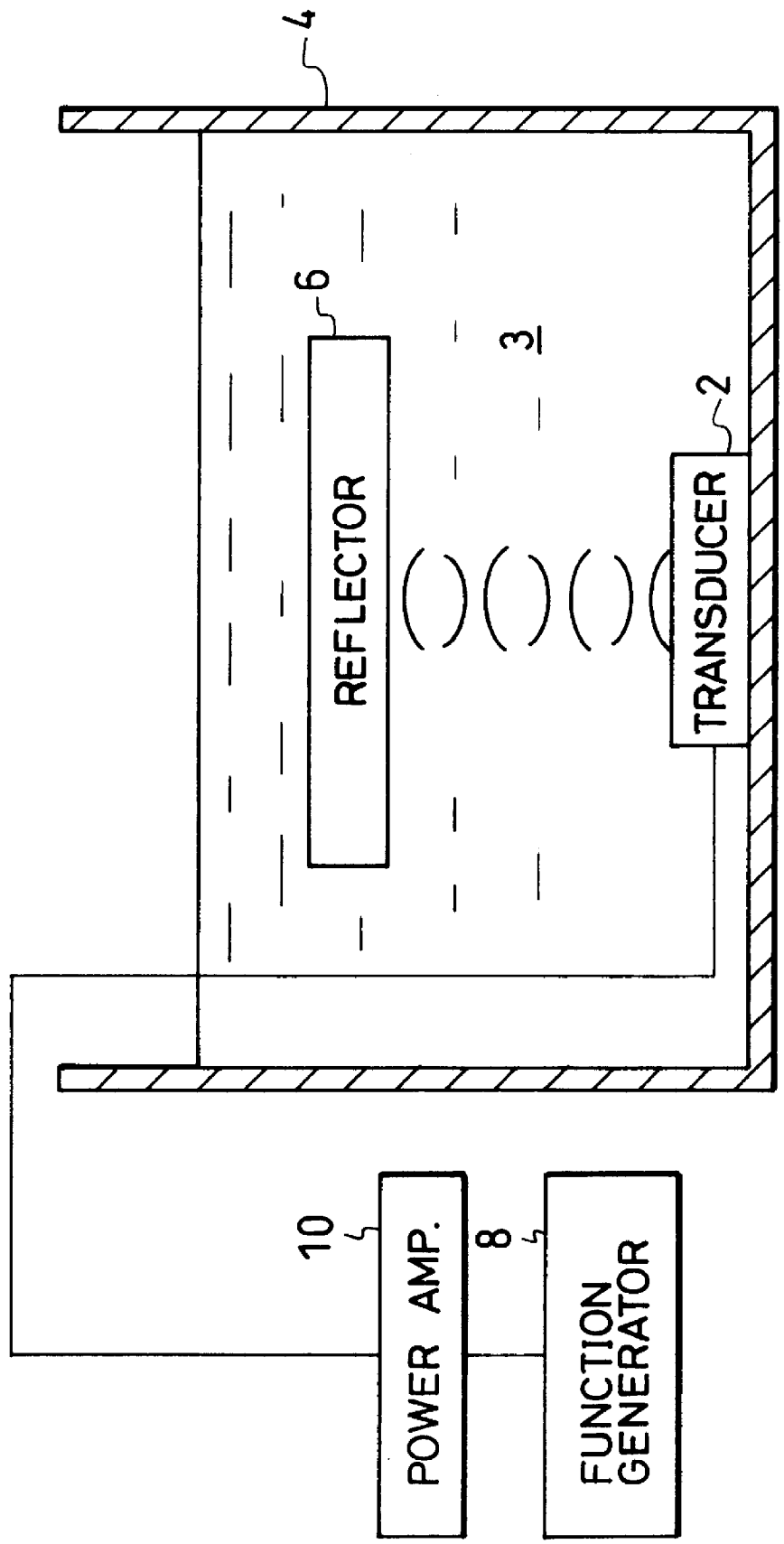
FIG. 1 is an illustrative view of an example of an apparatus for implementing the method of non-contact micromanipulation using ultrasound according to the present invention.

FIG. 1 shows the specific configuration of an apparatus for implementing the method of non-contact micromanipulation using ultrasound according to the present invention. In FIG. 1, a concave ultrasonic transducer 2 is disposed, concave side up, on the bottom of a water tank 4 filled with a liquid medium 3 such as water that propagates ultrasound. The water tank 4 also contains a reflector 6 positioned at the focal point of the transducer 2, the reflector 6 being parallel to, and facing, the transducer 2. The transducer 2 is connected via a power amplifier 10 to a function generator 8 outside the tank 4, whereby an alternating voltage of a prescribed frequency is generated by the function generator 8 and amplified by the power amplifier 10 for application to the transducer 2. The medium 3 may be any fluid medium that propagates sound with little energy attenuation and does not produce any change in the micro particles being manipulated. It is preferable to use a liquid medium, since the use of powerful, high frequency ultrasound necessitates a high density medium. Pure water at room temperature is used in the embodiment described below. However, the medium is not limited to pure water, but may be any other fluid that has an acoustic impedance that differs from that of the micro particles. Thus, the medium may be pure water to which salt or the like is added to adjust the specific gravity in order to cancel out micro particle weight or buoyancy, or oil may be used instead of water.

A known structure may be used for the concave transducer 2 set in the medium 3 to radiate ultrasound 11. It may for example be comprised of a transducer plate having electrodes via which a voltage from an external source is applied, around which a baffle is arranged to elastically support the transducer. The transducer has a prescribed resonant frequency that is determined by the shape and material of the transducer plate, and is driven at a prescribed frequency by applying a prescribed voltage to the electrodes. The transducer has a curved concave shape to provide the requisite concentration of the radiated ultrasound, and may be formed of piezoelectric ceramics. A material such as silicone rubber may be used for the baffle.

The resonant frequency of the transducer 2 has to be in the ultrasonic frequency range described below. For the same voltage, a radiated ultrasound frequency that is considerably different from the resonant frequency will result in a major reduction in the acoustic intensity. It is preferable for the transducer 2 to have a long focal distance (hereinafter, when the transducer is a curved concave type, the center of the curved surface will be regarded as the focal point and the radius of curvature as the focal distance), so long as movement of micro particles is not affected by the force of a medium flow produced by an acoustic radiation pressure gradient formed in the medium by attenuation of the propagating ultrasound. Compared to a high sound pressure region in a standing wave field formed using a transducer with a short focal distance, a high sound pressure region formed in a standing wave field produced using a transducer with a long focal distance is narrower in a plane orthogonal to the transducer axis and longer along the axis. This makes it possible to trap micro particles in a smaller region in the vicinity of the axis, and at more stable points along the axis, thus increasing the distance over which trapped particles can be moved. The reflector 6 used to reflect the ultrasound waves 11 from the transducer 2 may be a flat plate formed of ceramic material. A conventional water tank 4, function generator 8 and power amplifier 10 may be used.

It is preferable to use an ultrasound frequency of not less than 1 MHz. A frequency that is less than 1 MHz will reduce the degree of spatial changes in sound pressure distribution to the point where the radiation force urging the micro particles toward the nearest stable point will not be enough for full entrapment.

The upper limit for the ultrasonic frequency is determined by the following two conditions. First, the wavelength of the ultrasound in the medium has to be at least five times the size of the micro particles: a frequency corresponding to that wavelength forms the upper frequency limit. When the micro particles are sufficiently small, the upper frequency limit becomes as high as the upper limit of the resonant frequency of the transducer 2 to which a prescribed voltage can be applied. This is because while it is necessary to decrease the thickness of the transducer plate in order to increase the resonant frequency of the transducer 2 without changing the transducer material, for a standing wave field to be generated that can stably trap micro particles when a prescribed voltage is applied to the transducer 2, the thickness of the transducer plate cannot be reduced below a certain level. The upper limit will be around 10 MHz when a piezoelectric ceramic transducer plate is used.

With the ultrasonic frequency used in the method of the invention satisfying the above upper and lower limits, it is also preferable that the distance between the transducer 2 and the reflector 6, that is, the focal distance L of the transducer 2, be in the region of a frequency that satisfies the following relational equation (2) with radiated wavelength $\lambda$. In equation (2), n is a sufficiently large natural number.

$$L=(2n+1)\lambda/4 \qquad (2)$$

This ensures that resonance conditions between the transducer 2 and the reflector 6 are satisfied, keeps down attenuation of standing wave field energy in the medium 3, and enables micro particles to be stably trapped using less electrical power.

Ultrasound can be radiated from the transducer 2 in continuous waves or as intermittent burst waves. A burst wave here means a wave action consisting of repeated short time periods of ultrasound radiation and non-radiation. When ultrasound is radiated in pulses, it is preferable for the duty ratio of the burst wave, in other words, the proportion of the ultrasound radiation time period occupied by the sum of the ultrasound radiation on and off time periods, that is, the periodic ultrasound radiation on and off cycle (hereinafter referred to as the repetition period), to be not less that 3% and not more than 60%, and more preferably not less than 5% and not more than 50%. If the duty ratio is too low, gravity, buoyancy and the like will have a major effect on the micro particles, making it difficult to trap the micro particles. On the other hand, with a duty ratio that is too high, acoustic streaming will be inadequately suppressed, negating the merits of using burst waves. At a duty ratio of 100% a burst wave becomes a continuous wave. A burst wave repetition period is set to provide a long enough radiation time for the stable formation of a standing wave by the superposition of the traveling wave and reflected wave, and a short enough quiescent time. Hereinbelow, burst wave frequency refers to the frequency during pulsed ultrasound radiation, not to the frequency of ultrasound pulses and quiescent periods; that is, it does not refer to the reciprocal of the above repetition period.

In order to be manipulated by the method of this invention, micro particles have to have an impedance that is different from that of the medium; that is, they have to differ from the medium in acoustic velocity and density. Compared to liquids, acoustic velocity and density are higher in most solids, and lower in most gases. In the case of biotechnology applications, the medium would be physiological salt solution with water as the main component, and the micro particles would be living cells in which the main component is again water. The intended force will not work on matter having the same composition as the medium, but an experiment in which plant cells were inserted into a standing wave field showed that trapping was possible.

After the micro particles to be manipulated have been dispersed in the liquid medium 3, the function generator 8 is used to generate an alternating voltage at a prescribed frequency. After the voltage has been amplified by the power amplifier 10 it is applied to the transducer. 2, either continuously or intermittently according to a prescribed duty ratio, to produce continuous or burst waves of ultrasound radiation in the medium 3. Ultrasound thus radiating from the transducer 2 is intensively focused as it travels forward in the medium 3 in a direction corresponding to the radiation position on the transducer plate, to impinge on, and be reflected by, the reflector 6 disposed at the focal point of the transducer 2. These incident and reflected waves are superposed on each other, forming a standing wave field continuously or intermittently. The radiation force of the standing wave field thus formed urges the micro particles toward stable points set at half wavelength intervals by the properties of the micro particles and medium, thereby causing the micro particles to be trapped in the vicinity of the stable points in the standing wave field.

By using a concave ultrasound transducer 2, providing a reflector 6 at the focal point thereof and radiating ultrasound from the transducer 2 to form a standing wave field in accordance with this embodiment of the method of the invention, the energy of the ultrasound is focussed on the focal point region. As a result, the amplitude of the standing wave is only large at the focal point region, so that dynamically relatively stable points in the field are concentrated near the reflector 6 in the vicinity of the central axis and micro particles can be aligned and stably trapped in small regions in the vicinity of the stable points at stable point intervals, that is, every half wavelength, the micro particles thus trapped not being easily affected by frequency fluctuations or by changes in the sound field accompanying movement of the micro particles themselves.

In this embodiment of the method of this invention, the concave transducer 2, reflector 6, function generator 8 and power amplifier 10 are used to form an ultrasonic standing wave field in a tank 4 filled with a liquid medium 3 to thereby exert a non-contact force on micro particles. The range of micro particles that can thus be manipulated is thereby increased, the cost of the apparatus is low, and the micro particles can be securely trapped, virtually unaffected by friction and obstructions.

Furthermore, as ultrasound of the above frequencies quickly attenuates in air, safety during the manipulation can easily be ensured without having to consider the effect of ultrasound on the human body.

In accordance with the method of non-contact micromanipulation using ultrasound of the present invention, as described above, with the micro particles trapped in the vicinity of stable points in the ultrasonic standing wave field in the liquid medium 3, the micro particles can be moved along the central axis of the transducer 2 by changing the spacing between stable points continuously or in sufficiently fine increments by changing, continuously or in sufficiently fine increments, the frequency of the alternating voltage generated by the function generator 8 for application to the transducer 2.

Figure 2:
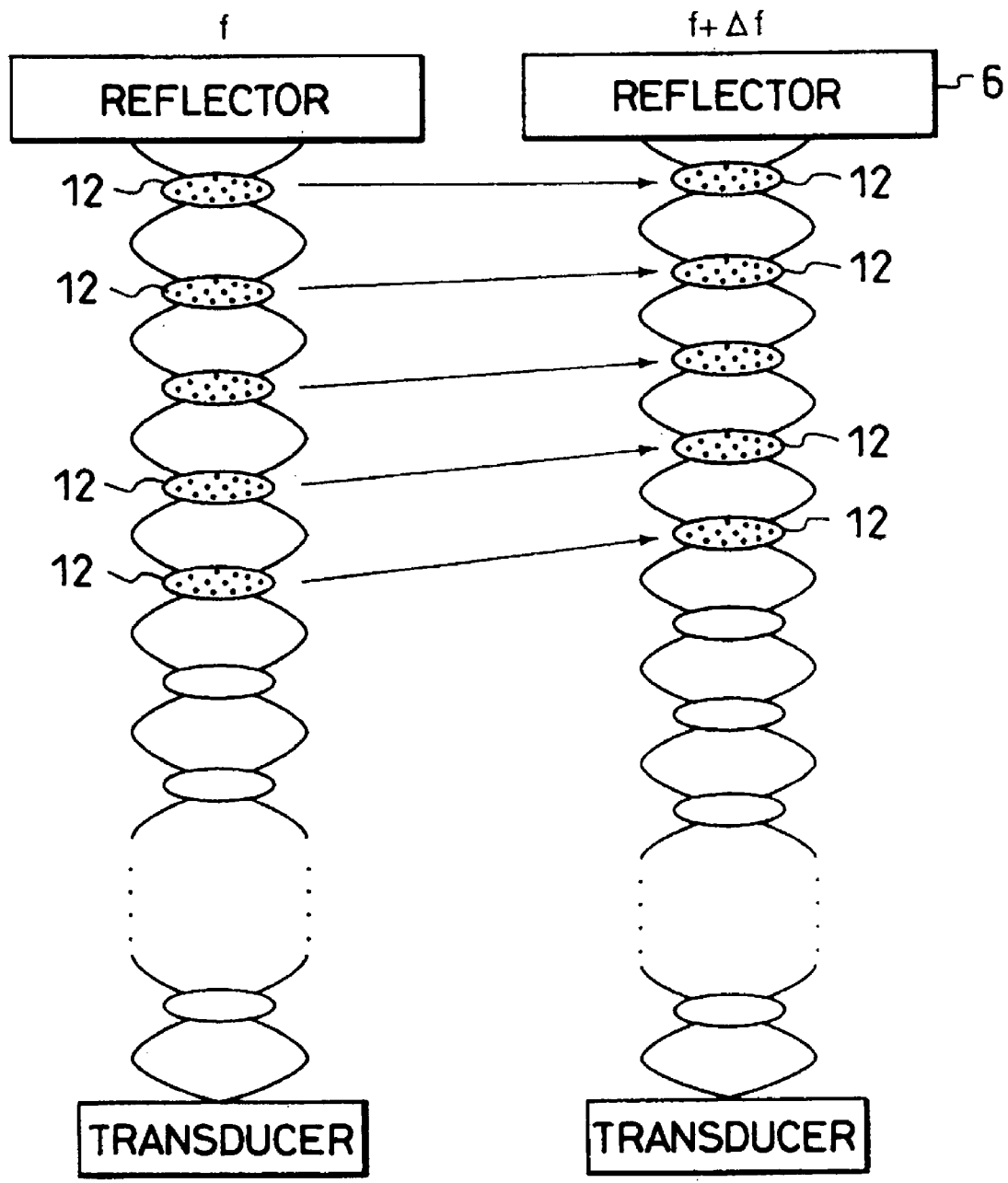
FIG. 2 illustrates how the positions of micro particle entrapment locations change when the ultrasonic wave frequency is increased from f to f+Δf, in the method of the invention.

More specifically, the inversely proportional relationship between frequency and wavelength means that changing the frequency also changes the positions of the sound field stable points located at half wavelength intervals. The micro particles trapped in the vicinity of a stable point that undergoes this change in position are also moved to the vicinity of the stable point's new location. For example, when axially positioned stable points in the sound field are located on nodes of the sound pressure distribution of a standing wave (which is the only case discussed below), if the frequency is changed from f to f+Δf either continuously or in sufficiently fine increments, micro particles 11 trapped in the vicinity of each stable point move slightly upward, as indicated by the arrows in FIG. 2. That is, in FIG. 2, in which the vicinity of the reflector 6 is emphasized, the ovals between the transducer 2 and the reflector 6 represent regions in the vicinities of stable points in the standing wave sound field, while the curved lines linking the ovals depict the sound pressure distribution of the standing wave sound field. At ultrasound frequency f, micro particles are agglomerated and trapped in the vicinities of up to the fifth stable point from the reflector 6. Clusters of thus-trapped micro particles are then moved to the vicinity of the corresponding new stable point by changing the frequency from f to f+Δf, either continuously or in sufficiently fine increments. If the initial frequency is f, the degree by which the frequency is changed is Δf and the sound speed in the liquid medium is c, the degree of movement $\Delta 1_n$ of the nth stable point from the reflector 6 is given by equation (3).

$$\Delta 1_n = (2n-1)c\Delta f/[4f(f+\Delta f)] \quad (3)$$

As is clear from the equation, since micro particles trapped at the stable point nearest to the reflector 6 are a quarter wavelength away from the reflector 6, the micro particles are moved by a distance that is a quarter of the amount by which the wavelength is changed, and micro particles trapped at the second stable point from the reflector 6 are moved by a distance that is the amount of movement by the first stable point plus the amount of change in the half wavelength, which is the amount of change in the spacing between the first and second stable points.

Since changing the frequency simultaneously changes the spacing between all the stable points in the standing wave field, the distance any stable point moves is the sum of the changes in all the stable point spacings between that stable point and the reflector 6. As such, the further a stable point is from the reflector 6, the greater the distance it is moved. As an example, if water is the medium, since the speed of sound in water at a normal temperature is approximately 1500 m/s, changing the ultrasound frequency from 5.00 MHz to 5.05 MHz will move micro particles trapped at the stable point nearest to the reflector 6 (n=1) about 0.7 $\mu$m, while micro particles trapped at the twentieth stable point from the reflector 6 (n=20) will be moved about 29.0 $\mu$m. While the extent of the movement therefore differs depending on the frequency, the degree of frequency change and the position of the stable point at which the particles are trapped, in some cases the particles can be moved several millimeters with submicron precision.

An apparatus that implements the method of non-contact micromanipulation using ultrasound in accordance with the present invention enables micro particles to be moved in a specific direction (along the central axis) without any moving parts, and entrapment spacing can be changed by changing the wavelength. Micro particles can therefore be accurately moved a distance determined by the degree of wavelength change and the position of the entrapping stable point, with a precision determined by the precision of oscillations applied to the transducer 2 and the precision of the velocity of sound in the liquid medium under the conditions of use.

With the method of non-contact micromanipulation using ultrasound according to this invention, moreover, as described above, the frequency of ultrasound radiated by the transducer 2 can be changed in steps by stepwise changes in the frequency of the alternating voltage generated by the function generator 8 for application to the transducer 2. By enabling micro particles trapped in the vicinity of stable points in the standing wave field in the liquid medium to be moved in a selected direction that is determined by the degree of frequency change selected, the micro particles trapped at half wavelength intervals can be separated or combined.

That is, when the frequency is changed continuously or in sufficiently fine increments, micro particles trapped in the vicinity of the stable points move to the vicinity of the corresponding newly formed stable points. If the function generator 8 is used to non-continuously change the frequency by a certain degree, the micro particles trapped at the stable points prior to the frequency change move to the vicinity of the stable points that are nearest after the frequency change. As such, using a plurality of stable points as a branch point, increasing the frequency in such steps causes a column of micro particles aligned at half wavelength intervals along the axis of the transducer 2 to divide into a plurality of columns that are mutually separated by an amount corresponding to the amount by which the frequency is increased. Conversely, decreasing the frequency in such steps causes some in the column of micro particles trapped in the vicinity of such stable points to be moved by an amount corresponding to the frequency decrease, into the vicinity of the same stable points, becoming trapped and forming agglomerations.

Figure 3:
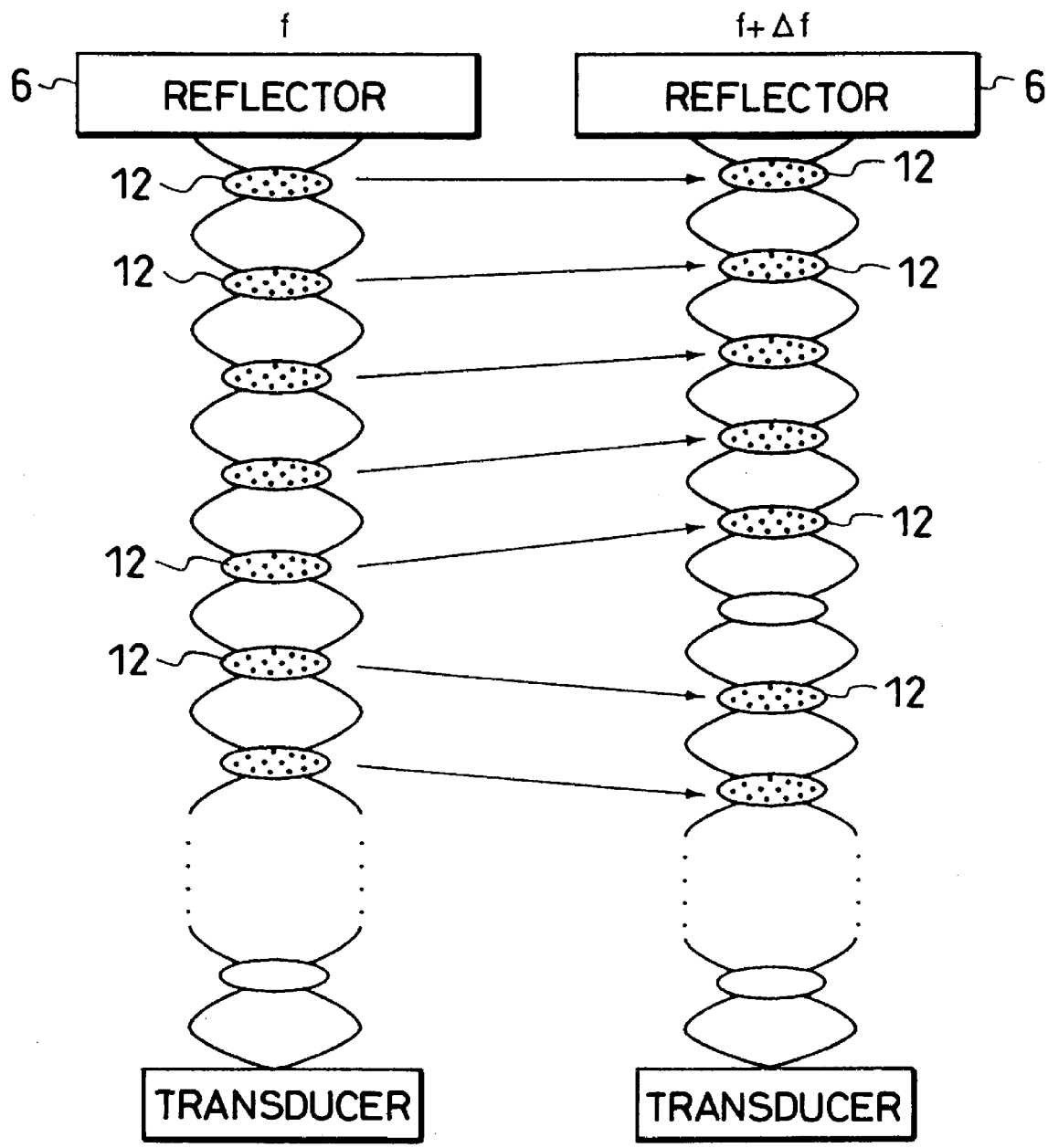
FIG. 3 illustrates how the positions of micro particle entrapment locations change when the ultrasonic wave frequency is non-continuously increased from f to f+Δf, in the method of the invention.

More specifically, FIG. 3 is an illustrative view with the emphasis on the region in the vicinity of the reflector 6, showing when the ultrasound frequency is non-continuously increased by Δf, from f to f+Δf. In the example shown in this drawing in which the fifth stable point from the reflector 6 forms the first branch point, following the change in frequency, agglomerations 12 (on the left side of FIG. 3) of micro particles trapped in the vicinity of up to the fifth stable point from the reflector 6 move to the vicinity of the corresponding stable point. However, following the change of frequency agglomerations 12 of micro particles trapped in the vicinity of stable points from the sixth stable point to the stable point of the second branch point (not shown) move to a stable point that is one below the corresponding stable point (on the right side in FIG. 3). Similarly, moreover, agglomerations of micro particles trapped in the vicinity of stable points from the second branch point, that is not illustrated, down to the third branch point, for example, will be moved to a stable point that is two below the corresponding stable point. Increasing the ultrasound frequency in steps of Δf enables columns of micro particle agglomerations extending to each of the dividing branch points, to be further separated while maintaining the mutually equidistant spacing.

If λ' is the wavelength corresponding to a frequency of f+Δf, the ultrasound frequency following the frequency change, the number of the first branch point, the one nearest the reflector, is provided by the maximum n value that satisfies the following inequality (4).

$$\Delta 1_n < \lambda'/4 \qquad (4)$$

Or it is provided by (5).

$$\Delta f < f/(2n-1) \qquad (5)$$

In other words, when the amount of stable point movement after a frequency change is half or more the spacing between stable points (a quarter wavelength), micro particles move to the stable point next to the corresponding stable point, that being the closest one. Micro particles trapped in the vicinity of adjacent stable points in such a border region will be moved in opposite directions. Since the post-change frequency is higher, the spacing (half wavelength) between stable points is decreased, and micro particles trapped in the vicinity of adjacent stable points in such a border region are moved in directions that increase their mutual separation.

Figure 4:
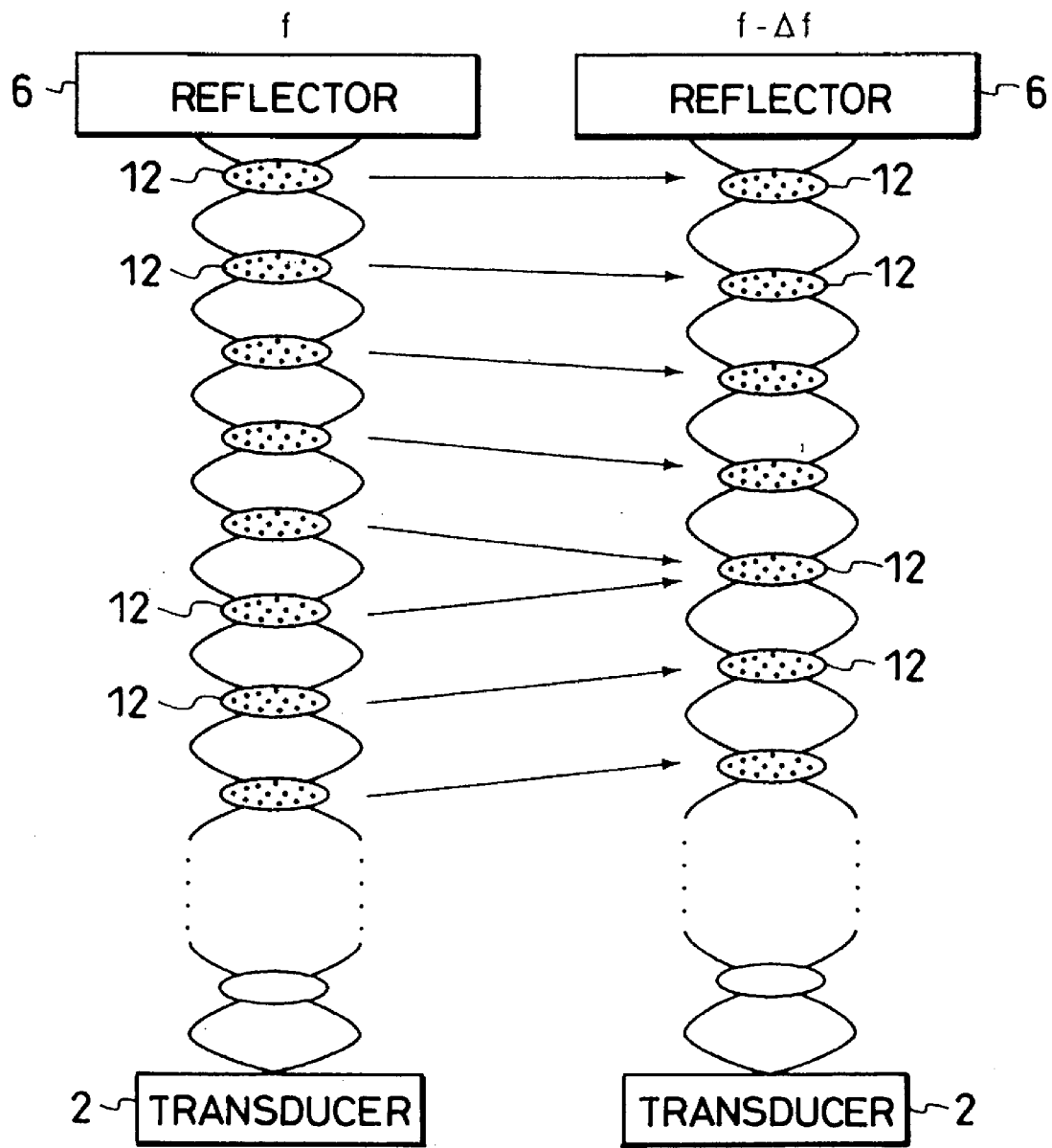
FIG. 4 illustrates how the positions of micro particle entrapment locations change when the ultrasonic wave frequency is non-continuously decreased from f to f−Δf, in the method of the invention.

FIG. 4 illustrates the result of a non-continuous decrease of Δf in the ultrasound frequency, from f to f−Δf. In the example shown in this drawing in which the fifth stable point from the reflector 6 forms the first branch point, when the frequency is changed agglomerations 12 (on the left side of FIG. 4) of micro particles trapped in the vicinity of up to the fifth stable point from the reflector 6 move to the vicinity of the corresponding stable point (on the right in FIG. 4). However, after the frequency is changed, agglomerations 12 of micro particles trapped in the vicinity of stable points from the sixth stable point to the stable point of the second branch point (not shown) move to a stable point that is one above the corresponding stable point. As a result, following the frequency change, both of the agglomerations 12 of micro particles trapped in the vicinity of the fifth and sixth stable points prior to the frequency change become trapped and consolidated in the vicinity of the fifth stable point.

Further decreasing the ultrasound frequency in Δf steps promotes further consolidation, as micro particles are trapped by fewer stable points than prior to the frequency change.

Thus, a column of agglomerations of micro particles aligned at half wavelength intervals along the axis of the transducer 2 near the reflector 6 can be divided at a specific stable point into small columns separated by a prescribed distance by a stepwise increase in the frequency of the ultrasound used to trap the particles. Conversely, agglomerations of micro particles can be consolidated by a stepwise decrease in the frequency of the trapping ultrasound.

When in accordance with the method of this invention ultrasound is radiated from the concave transducer 2 as a burst wave having a prescribed duty ratio, a standing wave field is formed intermittently in the medium 3 at time divisions that are substantially equal to the burst wave duty ratio. During the periods when a standing wave field is not formed, micro particles start to be moved from the entrapment position by gravity, buoyancy, acoustic streaming forces and other such external disturbances. However, during periods in which there is a standing wave field, the micro particles are returned to the vicinity of the stable points by an entrapment force from an acoustic radiation pressure that is substantially as strong as the entrapment force of a continuous standing wave field. Also, since the standing wave field is formed intermittently, during the periods when there is no standing wave field the medium 3 is not subjected to a force, so the velocity of an acoustic streaming generated in the medium 3 by the standing wave field is controlled.

That is, the micro particle trapping force exerted by the acoustic radiation pressure can be thought of as proportional to the square of the sound pressure amplitude, and the driving force of the acoustic streaming can be thought of as being proportional to the time-averaged square of the sound pressure amplitude. Therefore, radiating the ultrasound as a burst wave with a prescribed duty ratio makes it possible to maintain at a prescribed level the acoustic radiation force in the standing wave field used to trap the micro particles while at the same time reducing the driving force of the acoustic streaming, enabling the acoustic streaming velocity to be adequately controlled. It therefore becomes possible to increase the range of stepped frequency changes used to separate or combine trapped micro particles. This means that during micro particle manipulation it is possible to reduce the effect of the acoustic streaming and the like on trapped micro particles.

The result is that trapped micro particles can be securely moved, even when the positions of stable points in the standing wave field are changed by a considerable amount, such as when micro particles are manipulated by changing the frequency in large steps, during which it is easy to be affected by acoustic streaming, or when a transducer is used that has a long focal distance and is subject to the greater effect of higher acoustic streaming velocities. It therefore becomes possible to expand the range of stepped frequency changes that can be used to separate or consolidate trapped micro particles. Also, trapped micro particles can be moved over a longer distance by using a transducer with a long focal distance.

When in the method of non-contact micromanipulation using ultrasound according to this invention the ultrasonic wave radiated from the concave transducer 2 is switched from a continuous wave, such as a continuous sinusoidal wave, to a burst wave with a prescribed duty ratio, since micro particles are subjected to the constant entrapment force exerted by the acoustic radiation force from the standing wave field formed by the continuous wave, particles can be reliably trapped in the vicinity of sound field stable points even when the particles are moving at a high velocity relative to the medium, such as when they are injected into the medium. Switching then to burst waves also enables the above-described effects that accompany such use of burst waves to be obtained.

The method of non-contact micromanipulation using ultrasound according to the present invention was evaluated using the following examples.

In accordance with the apparatus configuration of FIG. 1, a concave ultrasound transducer 2 having a resonant frequency of 5.6 MHz comprised of a curved, concave transducer plate of piezoelectric ceramics 20 mm in diameter and approximately 1 mm thick, with a radius of curvature (focal distance) of 40 mm, together with a supporting silicone rubber baffle 30 mm in diameter, was placed on the bottom of a tank 4. Water was used as the ultrasound propagation medium 3. A bracket was used to fix a flat ceramic plate reflector 6 40 mm above the transducer 2. The transducer 2 was driven by a prescribed voltage applied from a power amplifier 10 outside the tank, for which the power amplifier 10 was connected to electrodes provided on each of the principal surfaces of the transducer plate.

A function generator 8 was used to generate a sinusoidal alternating voltage at the 5.6 MHz resonant frequency of the transducer 2, which was then amplified by the power amplifier 10 and applied to the concave transducer 2 to produce ultrasound radiation in the water and thereby form a standing wave field between the transducer 2 and the reflector 6.

Figure 5:
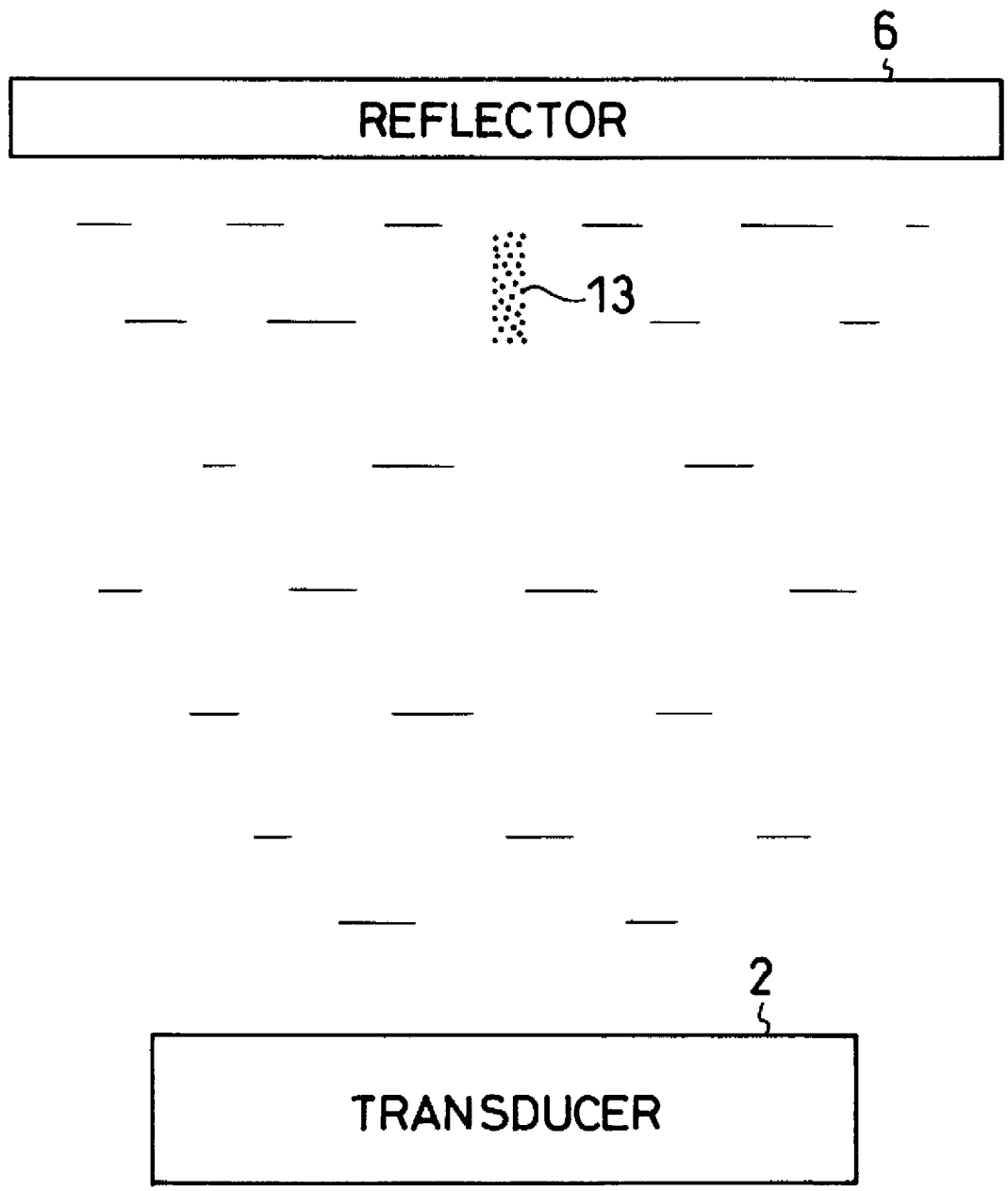
FIG. 5 illustrates a micro particle entrapment region in a standing wave field generated between a transducer and a reflector in an alumina particle entrapment experiment conducted using the method of this invention, in which the entrapment region is on the central axis of the transducer, near the reflector.

Alumina particles 13 with an average diameter of 16 $\mu$m were suspended in water and a pipette was then used to inject the suspension into the standing wave field. Following this, it was confirmed that the alumina particles agglomerated and were trapped at half wavelength intervals in regions in the vicinity of stable points along the axis of the transducer 2, near the reflector 6; in FIG. 5 a region is shown as a dense collection of dots.

Figure 6:
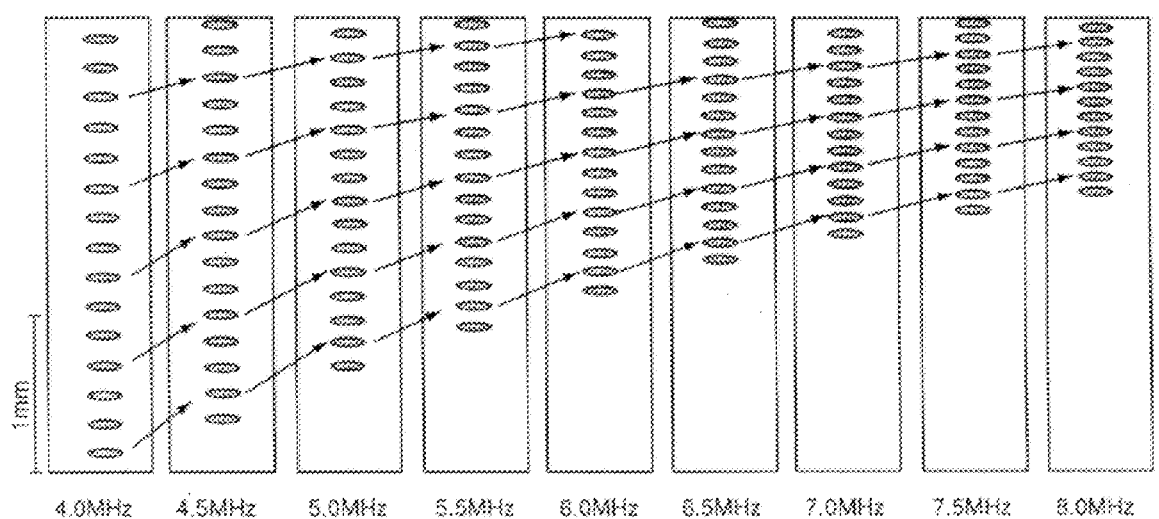
FIG. 6 is an enlarged view of the reflector in the region of the transducer axis, showing how the positions of alumina particle entrapment locations changed when the frequency of the standing wave was changed from 4 MHz to 8 MHz in 0.5 MHz increments in an alumina particle entrapment experiment conducted using the method of this invention.

With the alumina particles thus trapped, a sinusoidal alternating voltage of 40 Vpp applied to the transducer 2 at a frequency of 5.6 MHz was changed from a continuous state, that is, a 100% duty ratio state, to a 1 ms repetition period, 10% duty ratio state. The frequency was then changed from 5.6 MHz to 4.0 MHz, to form a burst standing wave field having a frequency of 4 MHz, a repetition period of 1 ms and a 10% duty ratio, which was used to trap the alumina particles. The trapped alumina particles were then moved by increasing the burst wave frequency from 4 MHz to 8 MHz in 0.01 MHz increments. FIG. 6 is an enlarged view of the central axis region near the reflector 6, showing the change in alumina particle entrapment positions for each 0.5 MHz change. In the drawing, each oval indicates a group of alumina particles trapped in the vicinity of one stable point. From this drawing, it can be understood that in a 4 MHz standing wave field, particles are agglomerated and trapped in the vicinity of nodes of the sound pressure distribution located every half wavelength (about 0.19 mm). It can also be seen that as the frequency is gradually increased, the spacing between groups of alumina particles trapped in the vicinity of the nodes decreases and the alumina particles move up along the axis of the transducer 2 toward the reflector 6, and that particles up near the reflector 6 move a short distance, while particles at the lower part, away from the reflector 6, move a longer distance than the upper particles.

Figure 7:
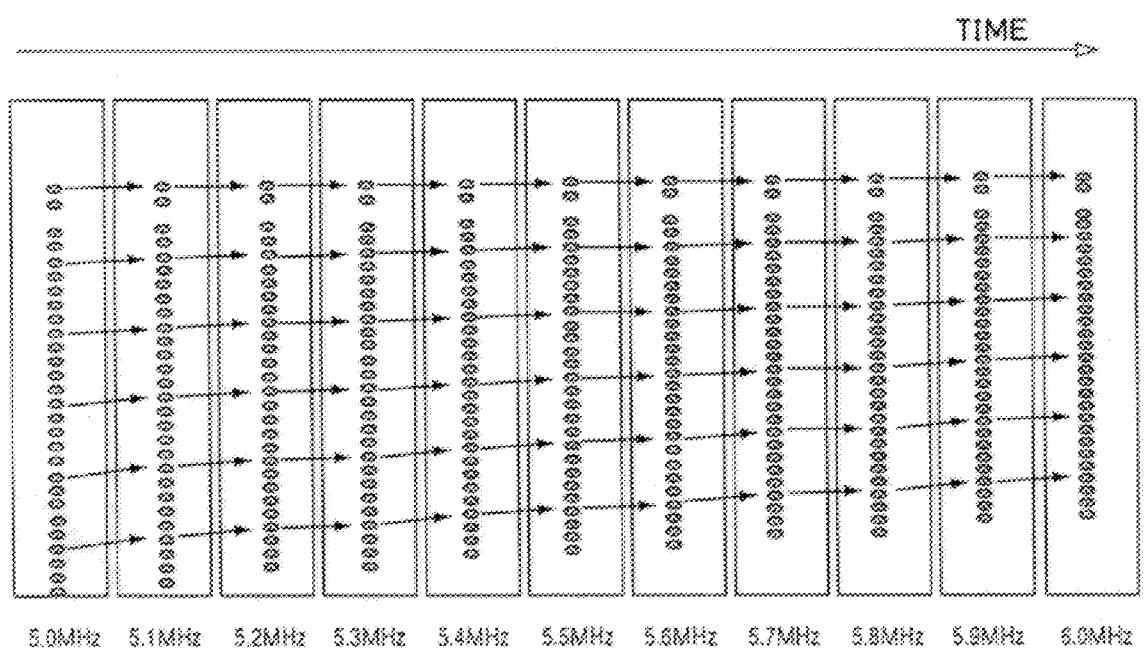
FIG. 7 is an enlarged view of the reflector in the region of the transducer axis, showing how the positions of alumina particle entrapment locations changed when the frequency was changed from 5 MHz to 6 MHz in 0.05 MHz increments in an alumina particle entrapment experiment conducted using the method of this invention.
Figure 8:
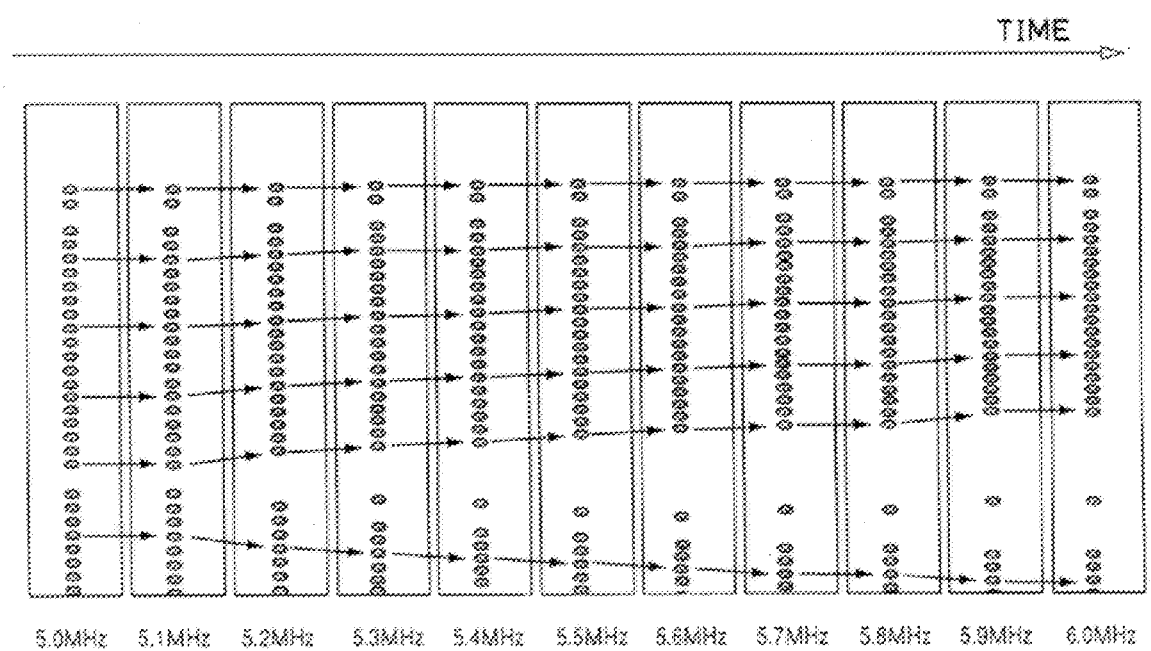
FIG. 8 is an enlarged view of the reflector in the region of the transducer axis, showing how the positions of alumina particle entrapment locations changed when the frequency was changed from 5 MHz to 6 MHz in 0.1 MHz increments in an alumina particle entrapment experiment conducted using the method of this invention.
Figure 9:
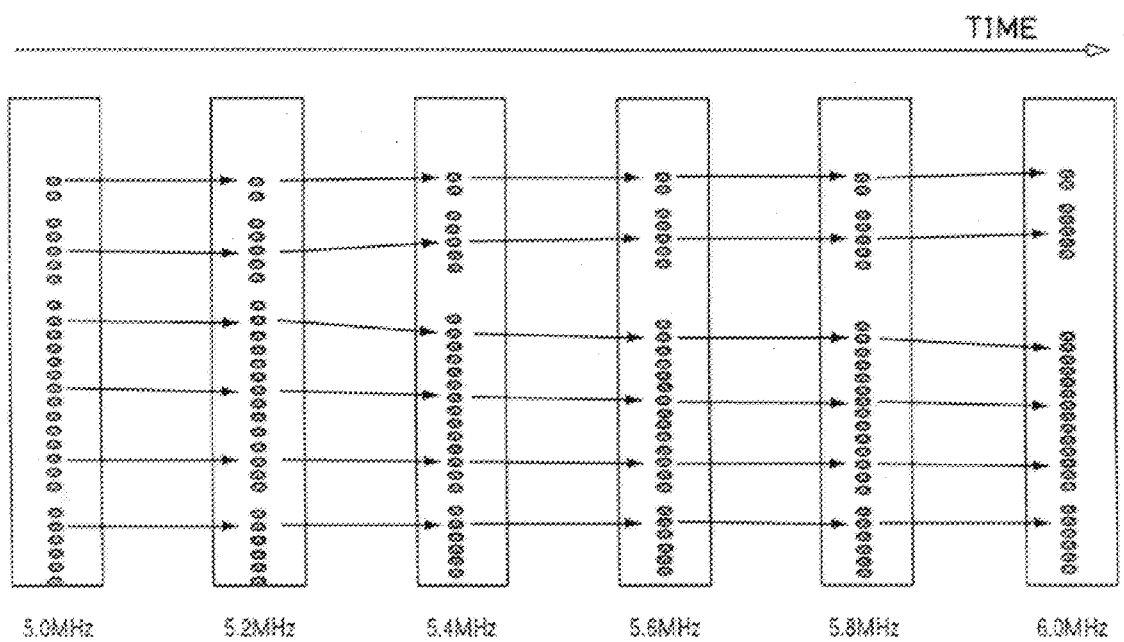
FIG. 9 is an enlarged view of the reflector in the region of the transducer axis, showing how the positions of alumina particle entrapment locations changed when the frequency was changed from 5 MHz to 6 MHz in 0.2 MHz increments in an alumina particle entrapment experiment conducted using the method of this invention.

Next, an experiment was conducted in which alumina particles were moved in their trapped state by changing the frequency applied to the transducer 2 from 5 MHz to 6 MHz in three different stepped amounts, while maintaining the same repetition period and duty ratio. The results are shown in FIGS. 7 to 9, which are enlarged views of the central axis near the reflector 6. Frequency changes were conducted in 0.05 MHz steps (FIG. 7), 0.1 MHz steps (FIG. 8) and 0.2 MHz steps (FIG. 9). (FIG. 7 does not show 0.05 MHz changes to 5.05 MHz, 5.15 MHz and so on.) In these drawings too, one oval indicates a group of alumina particles trapped in the vicinity of one stable point. From these drawings it can be seen that in the case of 0.05 MHz changes in frequency all the alumina particles in the drawing move upward, that is, toward the reflector 6, whereas in the case of the 0.1 MHz and 0.2 MHz frequency changes, although alumina particles trapped in the upper portions move upward, alumina particles trapped in the lower portions move downward. It can also be seen that branch points are moved higher by 0.2 MHz changes than by the 0.1 MHz changes.

Figure 10:
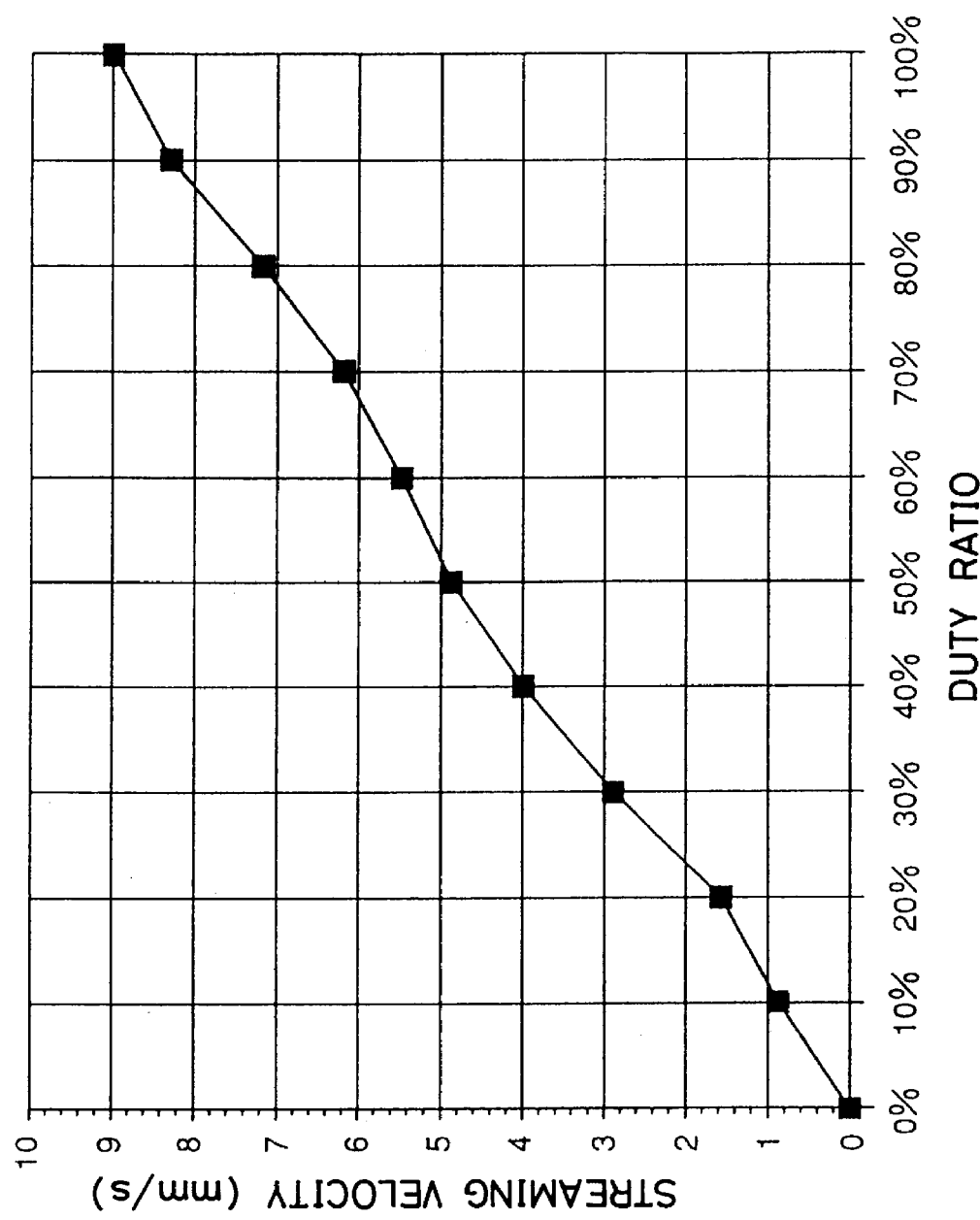
FIG. 10 shows the relationship between acoustic streaming velocity and burst wave duty ratio at a point on the transducer axis 5 mm from the reflector, in a burst wave field produced according to the method of the invention.

Reducing the duty ratio of burst waves enables the acoustic streaming force to be suppressed while maintaining the acoustic radiation force that traps the micro particles at the sound field stable points. To actually confirm this, a laser Doppler velocimeter was used to measure streaming velocity at a point on the transducer 2 axis 5 mm from the reflector 6 when the duty ratio was changed. In this experiment, a 5.6 MHz, 15 Vpp sinusoidal alternating voltage was applied to the transducer. The results are shown in FIG. 10, from which it can be seen that the acoustic streaming velocity is substantially proportional to the duty ratio.

It is possible to decrease the duty ratio of the burst waves to suppress the acoustic streaming while at the same time subjecting the micro particles to the powerful force of the acoustic radiation pressure. However, making the duty ratio too small increases the effect of gravity, buoyancy and the like, making it difficult to trap objects. The following procedure was therefore used to conduct an experiment to investigate the effect the duty ratio has on the entrapment force.

Figure 11:
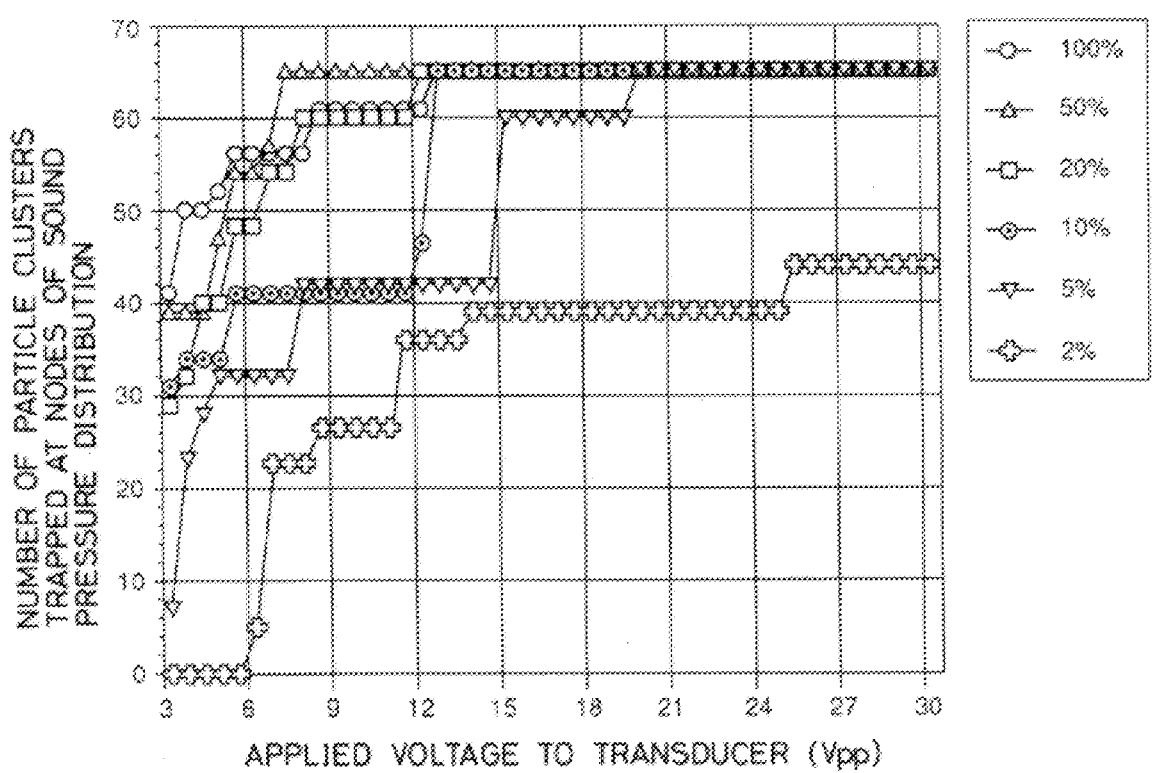
FIG. 11 shows the relationship between the voltage applied to the transducer and changes in the numbers of particle clusters trapped at sound pressure nodes in sound fields formed at various duty ratios of a burst wave in an alumina particle entrapment experiment conducted using the method of this invention.

After alumina particles were trapped using a 5.6 MHz continuous sinusoidal wave at an applied transducer voltage of 40 Vpp, it was switched to burst wave having a repetition period of 1 ms and a 50% duty ratio. The ultrasound radiation period in the burst waves was then gradually reduced and the ultrasound rest period in the burst waves was gradually increased to attain the required duty ratio. After the acoustic streaming had reached a steady state, the applied transducer voltage was gradually reduced while observing the behavior of the particles. FIG. 11 shows the number of particle clusters trapped at nodes of the sound pressure distribution, or put another way, changes in the number of nodes of the sound pressure distribution that stably trap particles, when the voltage was reduced with respect to duty ratios of 100% (continuous wave), 50%, 20%, 10%, 5%, and 2%. In each case, it can be seen that when the voltage was reduced, it became impossible to trap particles, starting with the clusters farthest away from the reflector, and more or less the same tendency was exhibited when the duty ratio was increased. Therefore, with respect to the conditions of this experiment, a duty ratio of not less than 3% made it possible for particles to be maintained by the acoustic radiation force which is sufficiently powerful compared to the force of gravity and the like, in addition to which the effect of the acoustic streaming can be suppressed.

Figure 12:
FIG. 12 shows micro particles, constituted by cells from the root of a tobacco plant, trapped using the method of the invention.

Next, using the same apparatus used in the above example, a large number of tobacco plant root cells (about 50 $\mu$m in diameter and about 1 mm in length) were suspended in water and a 1.75 MHz alternating voltage was amplified and applied to the concave transducer to form a standing wave field between the transducer and reflector. As shown by the results in FIG. 12, the cells were formed into agglomerations at sound pressure nodes at half wavelength (0.4285 mm) intervals.

As described above, it had been thought that it would not work with the plant cells having the same composition as the medium. However, since the cells are covered by a cell wall that reflects and absorbs sound waves, it was conjectured that it would be possible for the cells to be trapped by a standing wave.

The present invention has been described in the foregoing with reference to representative embodiments. However, it is to be understood that the invention is not limited to the examples.

In the above-described examples and embodiments, the concave ultrasound transducer comprises a curved, concave transducer plate of piezoelectric ceramics. However, any ultrasound transducer may be used that radiates intensively focussed ultrasound, such as one with a transducer plate that has a parabolically curved concave surface, and the material of the transducer plate is not limited to piezoelectric ceramics.

Also, while in the above-described embodiments the reflector 6 is a flat, ceramic plate, it is to be understood that the reflector may be of any shape and material that will allow a standing wave to be formed between the reflector and the concave ultrasound transducer 2.

Moreover, the alternating voltage applied to the transducer 2 is not limited to the sinusoidal waveform used in the above-described embodiments. For example, an alternating voltage with a rectangular waveform may be used.

While in the above-described embodiments the liquid medium 3 that fills the tank 4 has a free surface, the presence of a free surface is not a necessary requirement.

The present invention can therefore be worked in various modes that include alterations, modifications and improvements based on the knowledge of persons skilled in the art, and any such modes that do not depart from the gist of the invention are to be understood as coming within the scope of the invention.

As can be understood from the foregoing description, the method of non-contact micromanipulation using ultrasound according to the present invention enables micro particles to be stably trapped in prescribed small regions, and when trapped particles are to be moved an extended distance in a prescribed direction, enables such movement to be effected with high precision.

The method of the invention also allows the frequency of the ultrasound radiated by the transducer to be changed in stepped amounts. By thereby increasing the frequency of the ultrasound used to trap micro particles, for example, a column of micro particles trapped at half wavelength intervals can be divided into small columns. Or, conversely, the ultrasound frequency can be stepped down to consolidate and align portions of a column of micro particles trapped at half wavelength intervals.

Moreover, pulsing the ultrasound radiated by the transducer makes it possible to adequately suppress the velocity of acoustic streaming generated in the medium. This means that during micro particle manipulation and the like the effect of acoustic streaming on trapped micro particles can be reduced. As a result, trapped micro particles can be securely moved, even when the positions of stable points in the standing wave field are changed by a considerable amount, such as when micro particles are manipulated by changing the frequency in large steps, or when a transducer is used that has a long focal distance and is therefore subject to the increased effect of higher acoustic streaming velocities. It therefore becomes possible to expand the range of stepped frequency changes that can be used to separate or consolidate trapped micro particles, and trapped micro particles can be securely moved over a longer distance by using a transducer with a long focal distance.

What is claimed is:

1. A method of non-contact micromanipulation using ultrasound, includes providing a concave ultrasound transducer in a liquid medium in which micro particles are distributed, disposing a reflector at a focal point position of the transducer and radiating from the transducer ultrasound that is a burst wave of repeated cycles of short periods of sound radiation and non-radiation to form a standing wave field between the transducer and the reflector to align and trap micro particles at half wavelength intervals along a center axis of the transducer.

2. The micromanipulation method according to claim 1, wherein trapped micro particles are moved along the transducer axis by changing a frequency at which ultrasound is radiated from the transducer.

3. The micromanipulation method according to claim 2, wherein the frequency of ultrasound radiated by the transducer can be changed by a selected amount to select a direction in which the micro particles are moved to separate the micro particles trapped at half wavelength intervals.

4. The micromanipulation method according to claim 1, wherein the burst wave has a duty ratio that is not less than 3%.

* * * * *